(12) United States Patent
Kerry et al.

(10) Patent No.: US 7,507,030 B2
(45) Date of Patent: Mar. 24, 2009

(54) SLIM PROFILE TELECOMMUNICATIONS CONNECTION APPARATUS

(75) Inventors: John Kerry, Ipswich (GB); Philip A Barker, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 10/573,578

(22) PCT Filed: Sep. 8, 2004

(86) PCT No.: PCT/GB2004/003852

§ 371 (c)(1),
(2), (4) Date: Sep. 27, 2006

(87) PCT Pub. No.: WO2005/043867

PCT Pub. Date: May 12, 2005

(65) Prior Publication Data

US 2007/0161283 A1    Jul. 12, 2007

(30) Foreign Application Priority Data

Sep. 30, 2003    (GB)    ................................ 0322857.4

(51) Int. Cl.
*G02B 6/36* (2006.01)
(52) U.S. Cl. ........................................................ 385/53
(58) Field of Classification Search ................. 439/676, 439/53, 98, 135, 136, 137, 535, 538, 598; 385/53, 54, 55, 70, 135; 254/134.3 F
See application file for complete search history.

(56) References Cited

U.S. PATENT DOCUMENTS

| 4,349,236 | A   | 9/1982 | Guelden |
| 5,021,009 | A   | 6/1991 | Cox |
| 6,257,923 | B1  | 7/2001 | Stone et al. |
| 6,364,535 | B1* | 4/2002 | Coffey ........................ 385/53 |
| 6,594,435 | B2* | 7/2003 | Tourne ....................... 385/136 |
| 2002/0197046 | A1 | 12/2002 | Tourne |

FOREIGN PATENT DOCUMENTS

| CA | 2215441 C    | 9/2000 |
| DE | 20101943 U   | 6/2001 |
| EP | 0748460 A    | 12/1996 |
| WO | WO 96/07227 A | 3/1996 |
| WO | WO 02/13333 A | 2/2002 |

OTHER PUBLICATIONS

UK Search Report dated Feb. 16, 2004.

* cited by examiner

*Primary Examiner*—Chandrika Prasad
(74) *Attorney, Agent, or Firm*—Nixon & Vanderhye PC

(57) ABSTRACT

A wall plug is suitable for connecting an item of telecommunications equipment to a telecommunications network. The equipment and the network are separated by a wall, the wall including a bore communicating through the wall. The device includes a hollow body in the form of a tube engageable in the bore, the tube including a termination to terminate a cable connected to the telecommunications network. A connection is made to a connector of the item of telecommunications equipment, the termination and connection being so arranged that with a cable terminated on the termination, connection of the connector to the connection provides an interconnection between the equipment and the network.

29 Claims, 16 Drawing Sheets

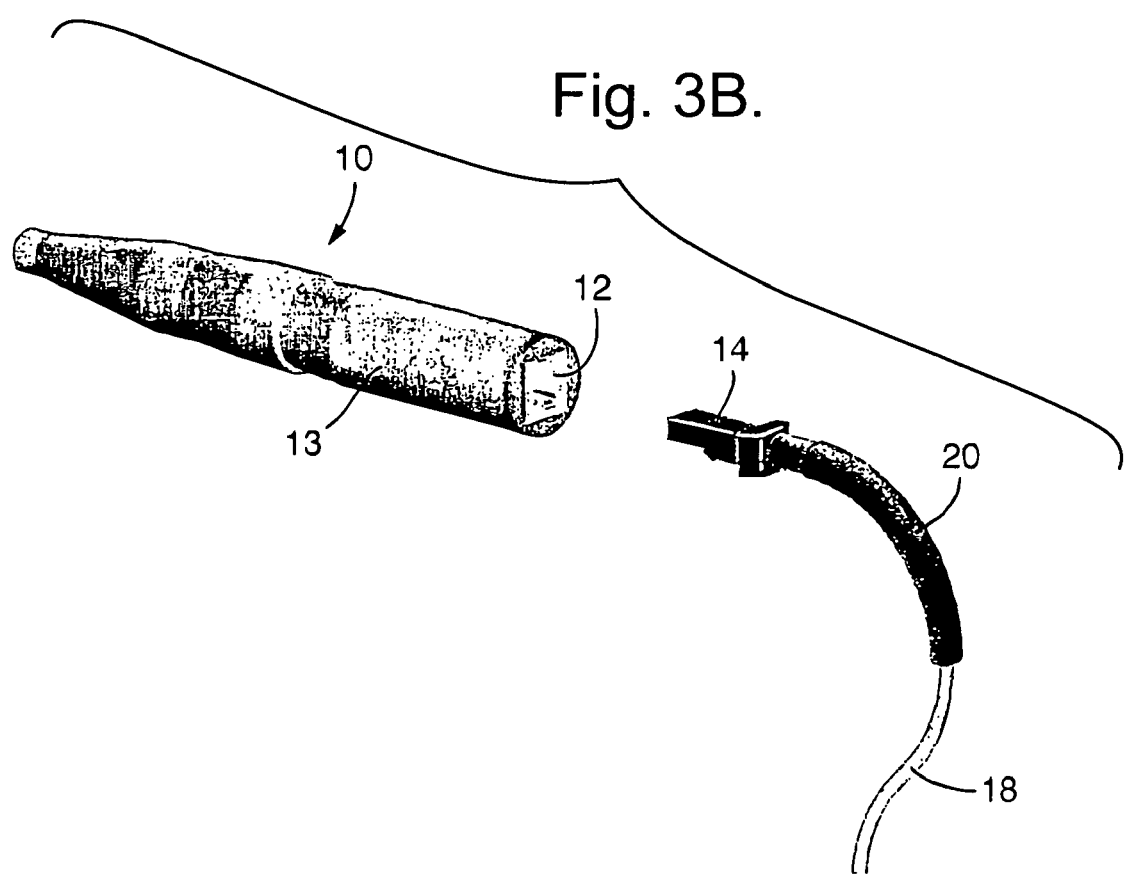

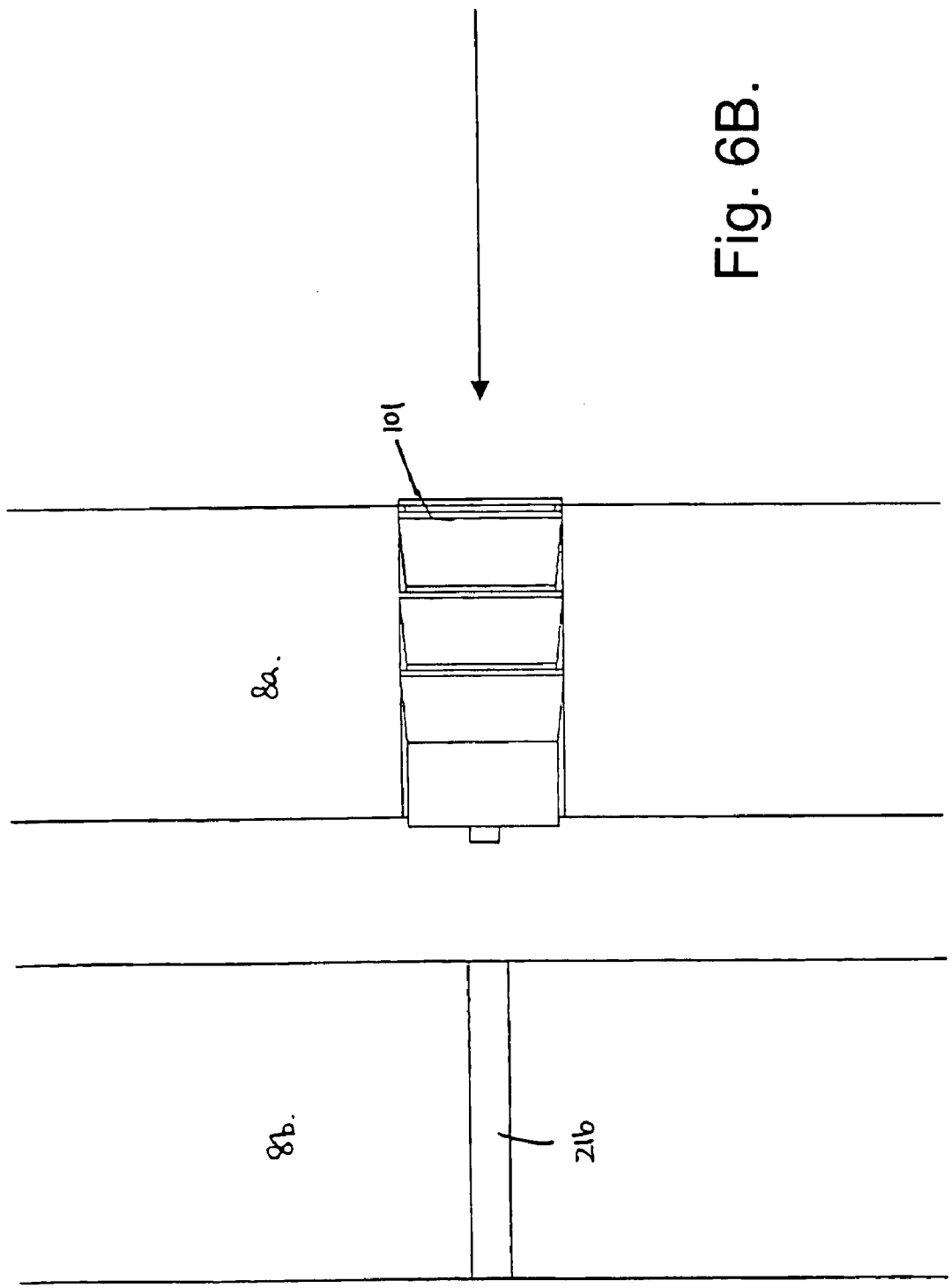

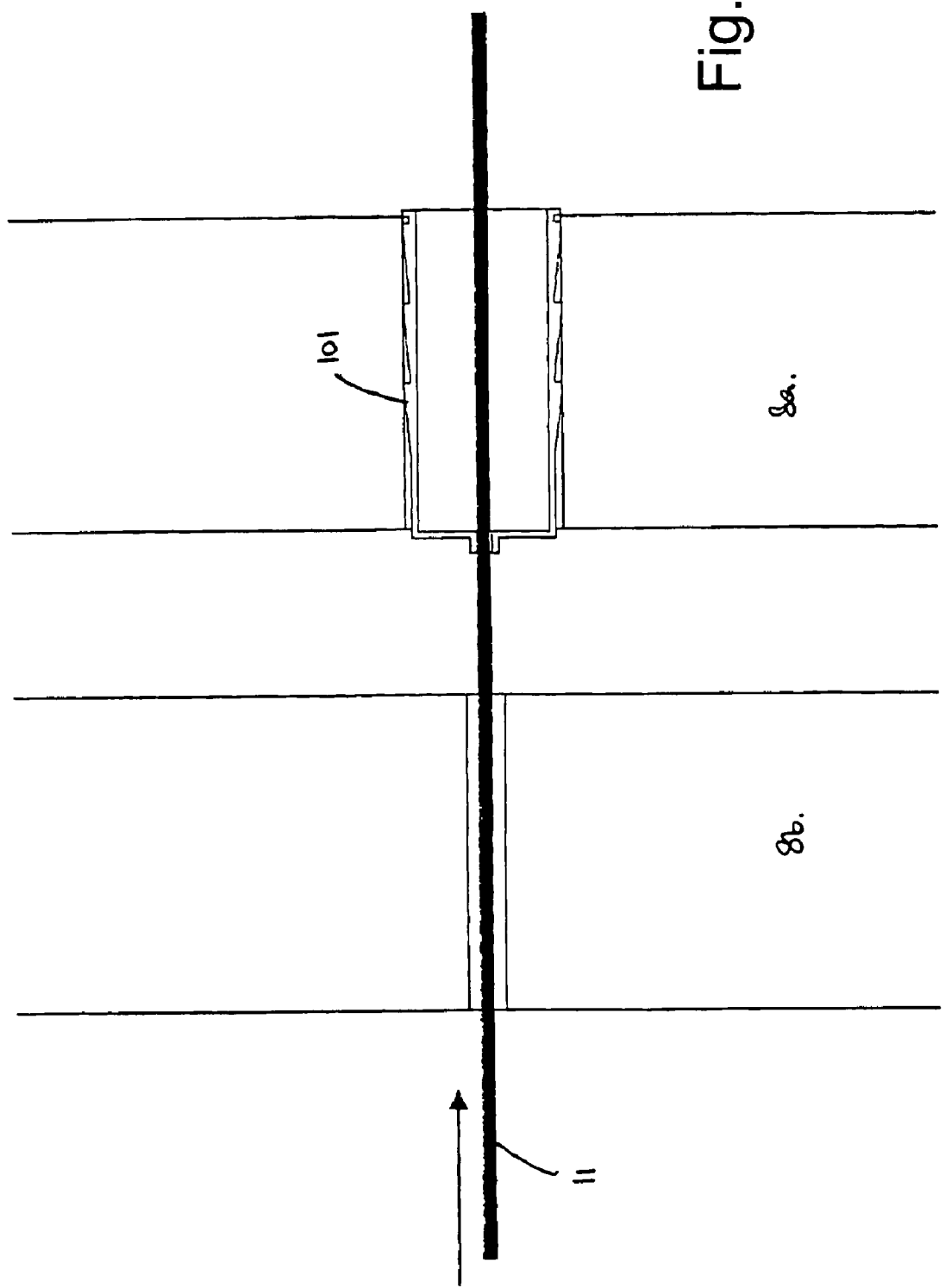

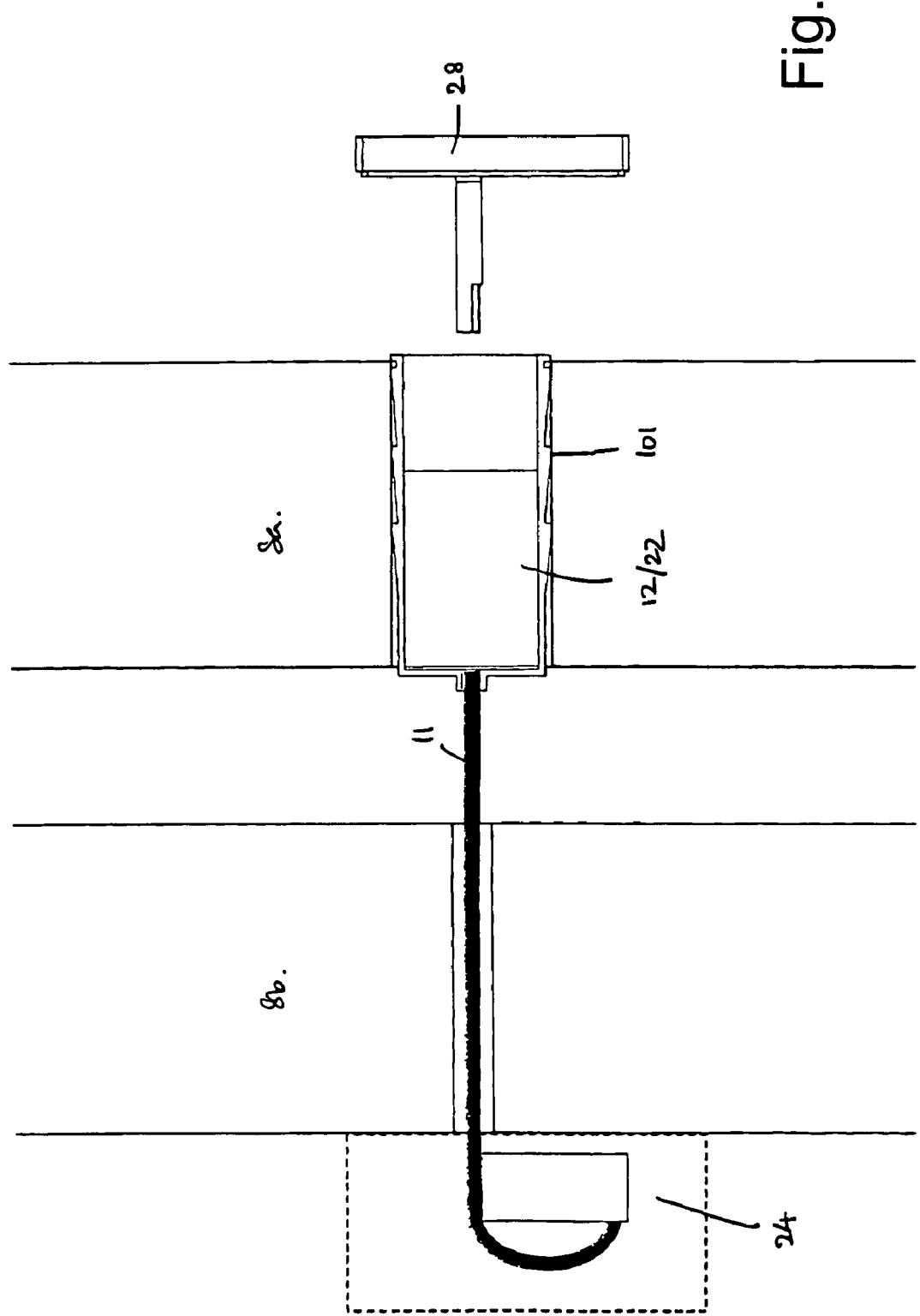

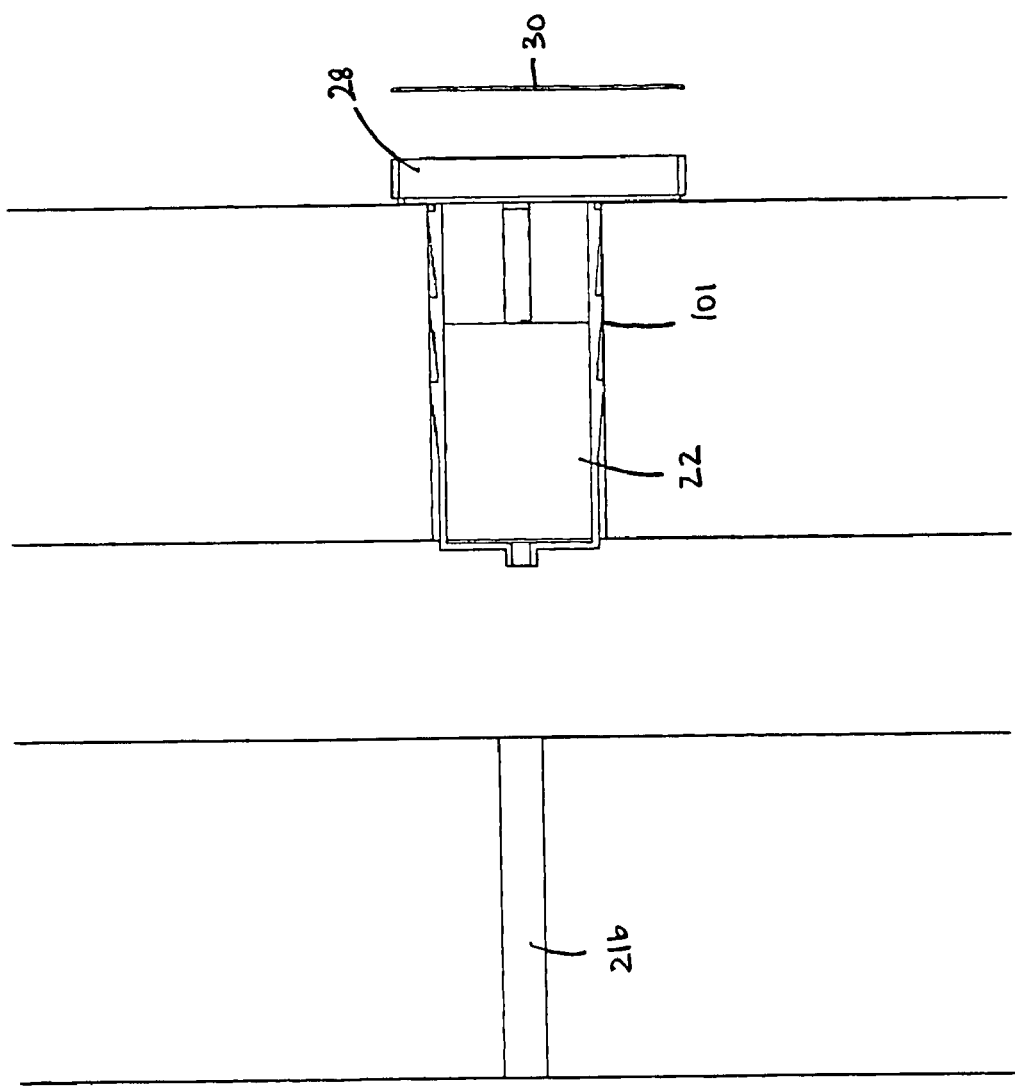

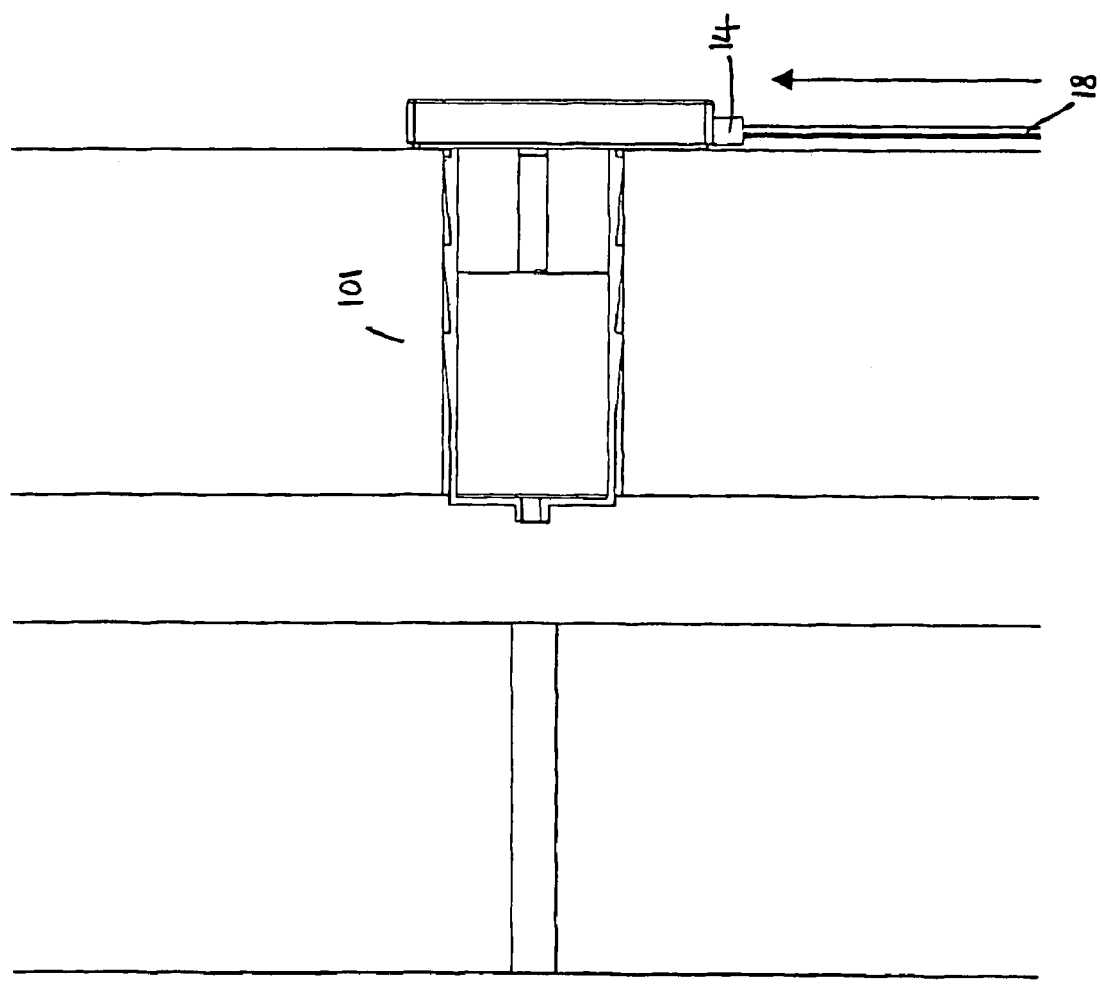

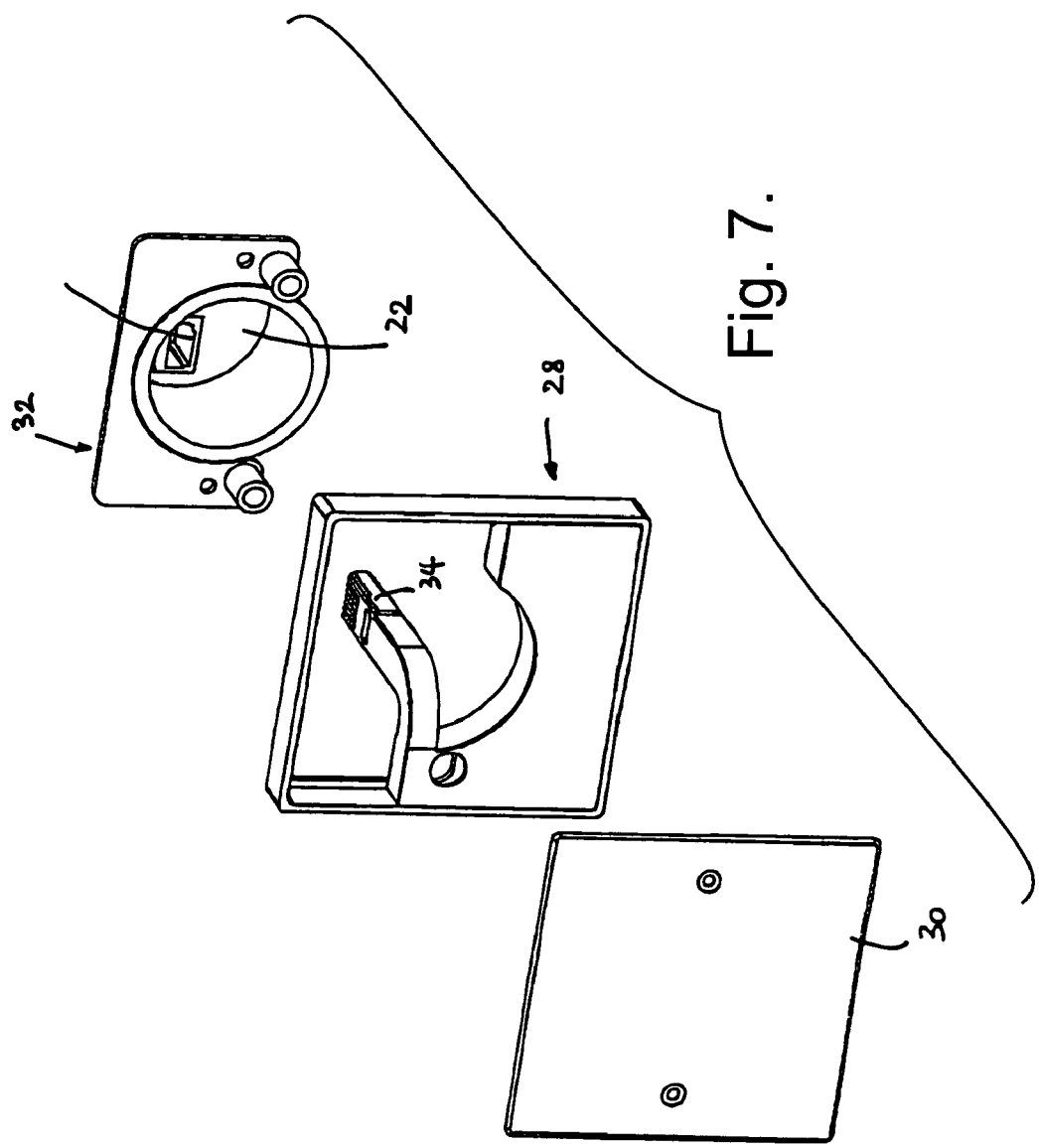

SLIM PROFILE TELECOMMUNICATIONS CONNECTION APPARATUS

BACKGROUND

1. Technical Field

This application is the U.S. national phase of international application PCT/GB2004/003852, filed 8 Sep. 2004, which designated the U.S. and claims priority of GB 0322857.4, filed 30 Sep. 2003, the entire contents of each of which are hereby incorporated by reference.

This invention relates to telecommunications connection apparatus, and is of particular relevance in the context of terminating and connecting cables to connect customer premises to the external telecommunications network at end user entry points.

2. Related Art

In a typical customer's premises, telephones and such telecommunications devices are connected to the external telecommunications network at a network termination point, which is the physical demarcation point between the customer's premises and the network of external network service providers (such as British Telecommunications pic in the UK). External cables, typically copper pairs at the present time, arrive either overhead or underground from distribution points to the wall of the customer's premises. They are then passed through the fabric of the wall and terminated within the premises in network termination equipment units (e.g. the NTE 5 or NTE Elite modules) which are housing boxes mounted on or partly recessed In the customer's interior wall. These network termination boxes include sockets ready to receive a compatible connector plug (e.g. the RJ-11 or RJ-45).

The typically white plastic termination boxes currently in use are relatively large and can protrude about 36 mm from the wall when mounted. Their bulk can be aesthetically displeasing and further the boxes are vulnerable to being bumped or knocked into and damaged.

The trend however has been that increasing numbers of these termination boxes are being deployed in customer's premises, particularly in residences. For example, the rise in the numbers of people working from home requiring work-dedicated telephone lines, facsimile lines and Internet and intranet access, etc., has meant that the chunky plastic termination boxes can no longer be easily hidden away in a corner of the house. While people have come to accept a profusion of unsightly wall outlet boxes in an office or working environment, littering residential premises with these boxes is an unattractive but currently unavoidable proposition.

Additionally, the advent of Asymmetric Digital Subscriber Line (ADSL) and Home Phoneline Networking Alliance (HPNA) has meant that the space taken up by such telecommunications plant has increased further. Microfilters and other forms of electronics have to sit in a position between the network termination point socket within the unit and the plug from the customer apparatus, be it the telephone or the computer modem.

Yet another issue arises from the issue of upgradeability from copper to optical fibre. While currently domestic subscribers' premises are generally connected with copper wire electrical cable, domestic subscribers who wish to have a "fibre to the home" connection must have their copper replaced by fibre which necessitates all replacement of all existing termination and access arrangements. It is also expected that in the future the entire network, including the access network into customer's premises, will be constituted by fibre. Replacement of not just the cable but also the surrounding infrastructure is required as the properties of optical cable and copper wires are quite different, as discussed below, so that cable runs, building entry methods and network termination equipment for fibre will have to be treated differently.

In particular, the way optical fibre is routed into customer's premises and terminated will be very different from current methods for copper pairs. Optical fibre generally has a wider minimum permissible bend radius than copper wire, which can usually be bent through 90 degrees or less, without significantly impairing its transmission ability. Optical fibre on the other hand is very sensitive to bends along its length, and bending more tightly than, a minimum bend point (the "minimum bend radius" or "minimum permitted bend radius") would cause unacceptable optical losses. A known way to manage the minimum bend radius of optical fibre entering customer premises through the wall fabric is described in EP 0748460. This device and method is further described below against FIG. 1, but it essentially involves controlling the path of the exiting cable, to reduce the fibre's radius to substantially its minimum, while guarding against fibre breakage or loss. The external cable passing through the walls into the premises is then typically terminated on the inner wall in a separate wall outlet box, to which socket a RJ-45 connector will be plugged.

According to the prior art device and method, the problem of the bulk is made worse in that there are now at least two sets of housing or boxes on the internal wall of a customer's premises—one to manage the optical fibre bend as it enters the premises, in addition to the wall outlet box.

BRIEF SUMMARY

The connection device of the present exemplary embodiment reduces the space requirement for and amount of telecommunications plant in the form of housings, boxes and the like visible to the customer within his premises. This has the result of reducing the risk of damage to trailing cables and housing boxes protruding from the wall. It also reduces cost through reduced plant, and has the important benefit of streamlining the appearance of the Network Termination Point in the interior of the customer's premises, which is of particular significance in a residential setting.

Another very important advantage of the embodiments of the new connection device is that they are future-proof. The embodiments described below all take into account the prospect that the copper wire in today's network termination points will be one day replaced by optical fibre, where (i) the cable entering the customer's premises will be fibre; and/or (ii) the cable of the connector plug will be fibre.

In a first aspect, the invention provides a wall plug suitable for connecting an item of telecommunications equipment to a telecommunications network, wherein the equipment and the network are separated by a wall, the wall including a bore communicating through the wall, the device comprising a hollow body in the form of a tube engageable in the bore, the tube including termination means to terminate a cable connected to the telecommunications network; and connection means to receive a connector of the item of telecommunications equipment, the termination and connection means being so arranged that with a cable terminated on the termination means, connection of the connector to the connection means provides an interconnection between the equipment and the network.

In a second aspect, the invention provides a wall plug having a body to be received within a bore in a wall, the body having at one end a cavity housing an electrical or optical connector, a passageway coupled to the cavity to permit a communications cable to pass into the housing and to couple to the connector.

BRIEF DESCRIPTION OF THE DRAWINGS

Embodiments of the invention will now be described by way of example only with reference to the accompanying drawings in which:

FIG. 3B is a view of the connection device according to the invention further showing how it may be used with a connector plug.

FIGS. 6A to 6H describe how the connection device can be installed.

FIG. 7 depicts the components making up the network termination housing.

DETAILED DESCRIPTION OF EXEMPLARY EMBODIMENTS

Figure 1A:
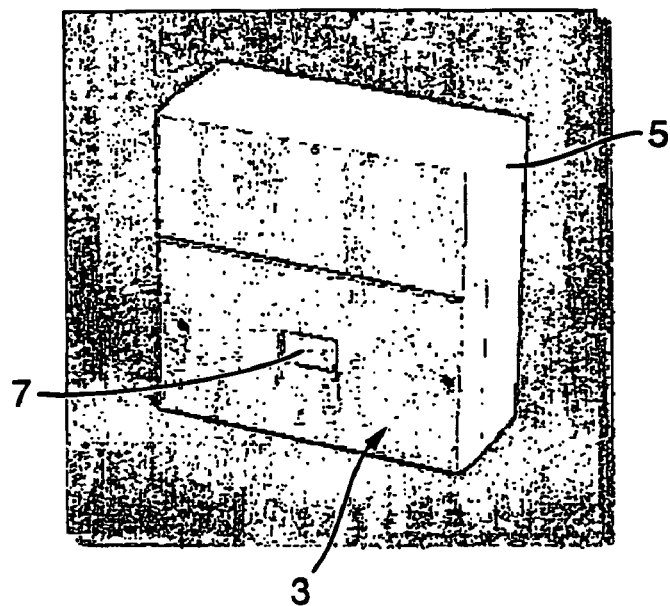
FIGS. 1A and 1B depict the front and back views respectively of a network termination unit box NTE 5 of the prior art.
Figure 1B:
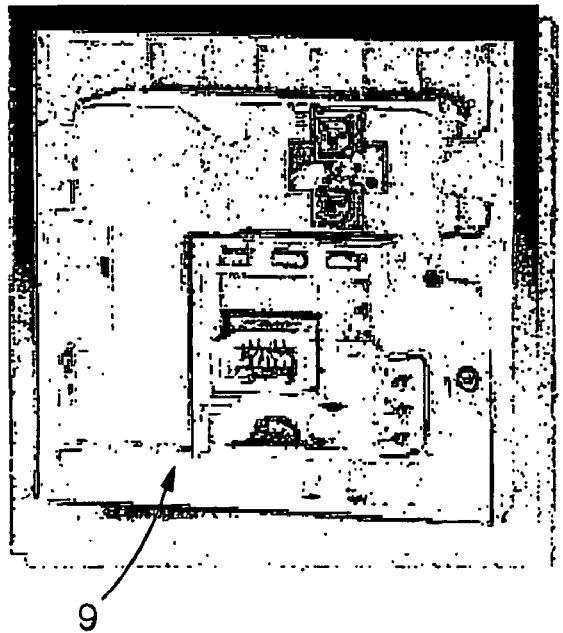

FIG. 1A shows a front (3) view and FIG. 1B shows a back (9) view of the prior art network termination equipment NTE 5 (3). This is the UK industry standard terminating box to which a connecting plug is plugged to connect the piece of customer equipment such as a telephone, to the external network. The box in this case has dimensions of 86 mm (L)×86 mm (W)×36 mm (D). The socket (5) of the NTE 5 is positioned so that any connector plug (with its attached cable) plugged in would protrude even further from the wall upon which the NTE 5 is mounted. This unit is used in a copper wire network termination installation.

Figure 2:
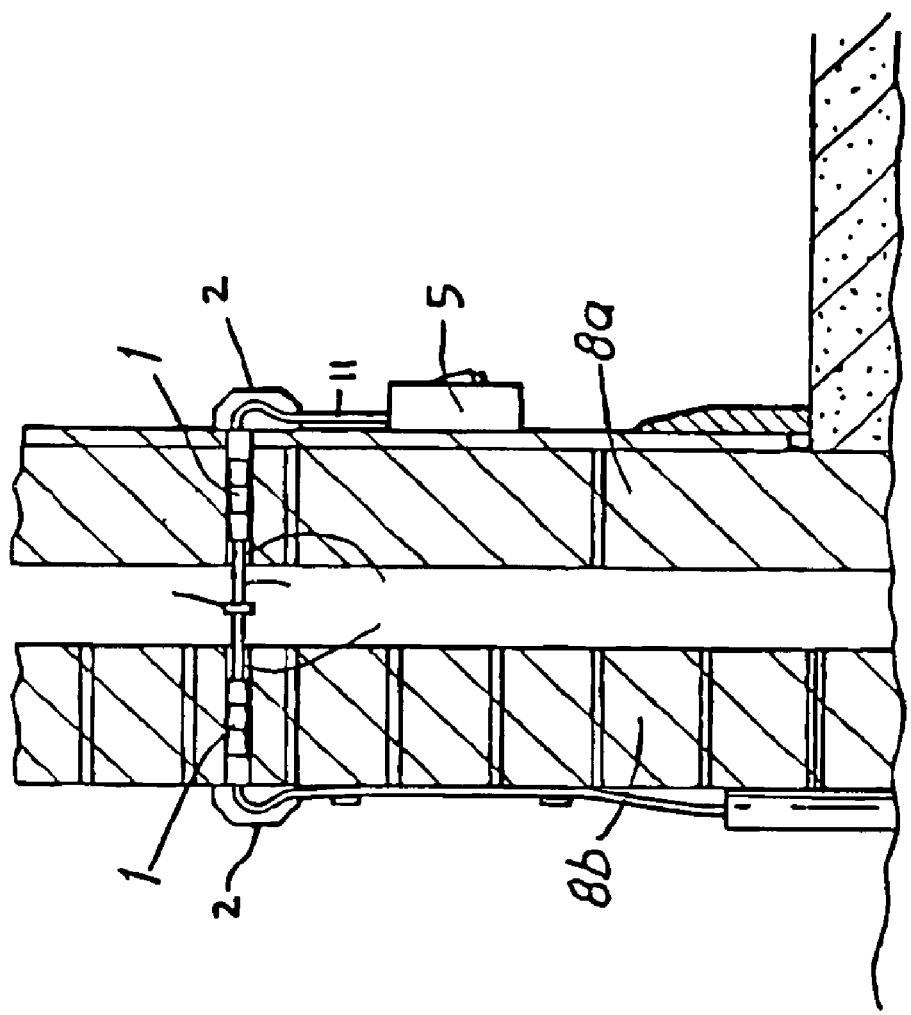
FIG. 2 depicts an optical fibre network termination installation of the prior art.

Turning to FIG. 2, this depicts an optical fibre-ready installation, and how the fibre entering a customer's premises can be managed using the prior art device and method described in EP 0748460. The discussion of this optical installation is relevant to the invention in the context of its upgradeability when copper to fibre will be one day replaced by fibre in the home.

The prior art device (1) is essentially a hollow tube frictionally inserted into the access hole in the customer's wall (8), so that the mouth of the plug is substantially flush with the mouth of the access hole. The fibre (11) passes through the external cavity wall (8b) via a first wallplug, through the cavity between the walls, then via the second wallplug, through the internal cavity wall (8a) into the premises. The bend radius is controlled by a complementary member (2), which includes a bore through which the fibre travels upon exit from the internal wall. The bore's curve is defined to be at or near the minimum bend radius of the optical fibre. Thus the wallplug (1) and the complementary member (2) manage the exiting fibre by protecting it from both physical damage and exceeding (i.e. being bent more tightly than) its minimum bend radius.

After the cable (which can be fibre or metallic) exits the complementary member (2) in this prior art installation, it is terminated at a network termination box such as the NTE 5 (5). As noted in the introduction, this box is relatively large and typically protrudes some 36 mm from the wall. As noted above in connection with FIG. 1, the protrusion of the termination box and the connector plug with its trailing cable when plugged in, is such that entire assembly is prone to accidental damage.

First Embodiment

Figure 3A:
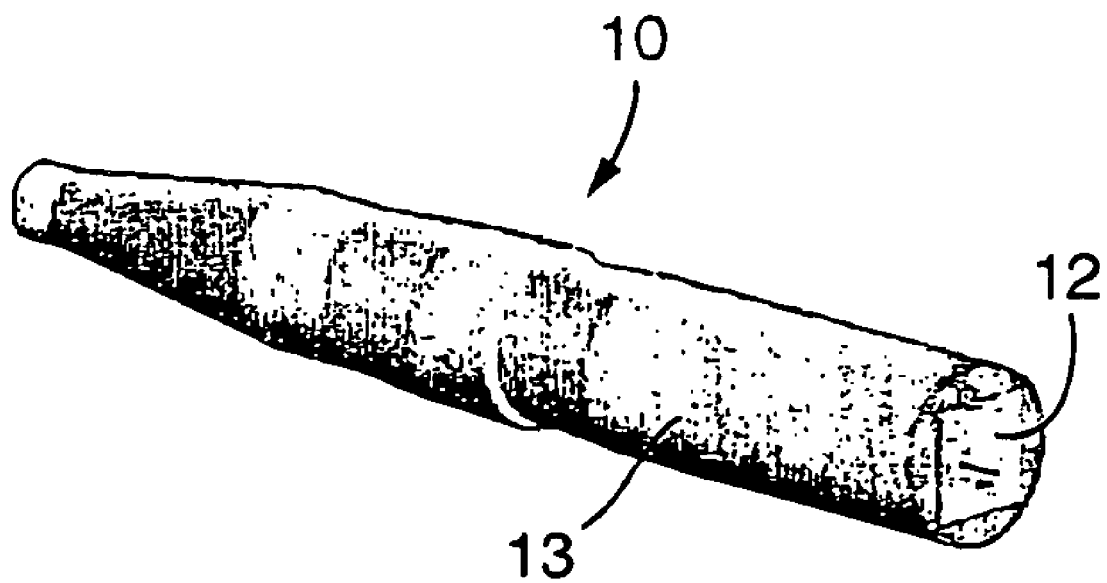
FIG. 3A is a view of an embodiment of the connection device according to the invention.

FIG. 3A shows a first embodiment of the present invention. Like the prior art device described above in connection with FIG. 2, the device of the invention comprises a hollow tube (10) which is fixed inside the access bore of the premises walls in use so that the mouth of the plug is substantially flush with the mouth of the access hole. The telecommunications cable (11)—which could be copper wire or optical fibre—travels though the bore via this hollow tube. However this device according to this embodiment of the invention further includes a socket (12) (such as a line jack connector outlet, similar to the socket housed in network termination box NTE 5 described in FIG. 1). This socket is located at the end of the tube proximate to the mouth of the bore.

FIG. 3B shows how a connector plug such as an RJ-11 or an RJ-45 (14) can be plugged directly into the connection device socket. When the device is in position in the bore of the customer's wall, the connection will be effected substantially at or near the surface of the interior wall (8a). It can be seen that there is a measure of bend control on the sheath (20) housing the cable of the connector plug (sometimes known as a "bend control boot"), in that the path of the connector cable (18) is managed. Of course such bend management would not be necessary if the connector cable was copper, although the arrangement in no way impairs the performance of the copper. The configuration does however ready the installation for the conversion from copper to fibre when the day arrives.

Figure 4A:
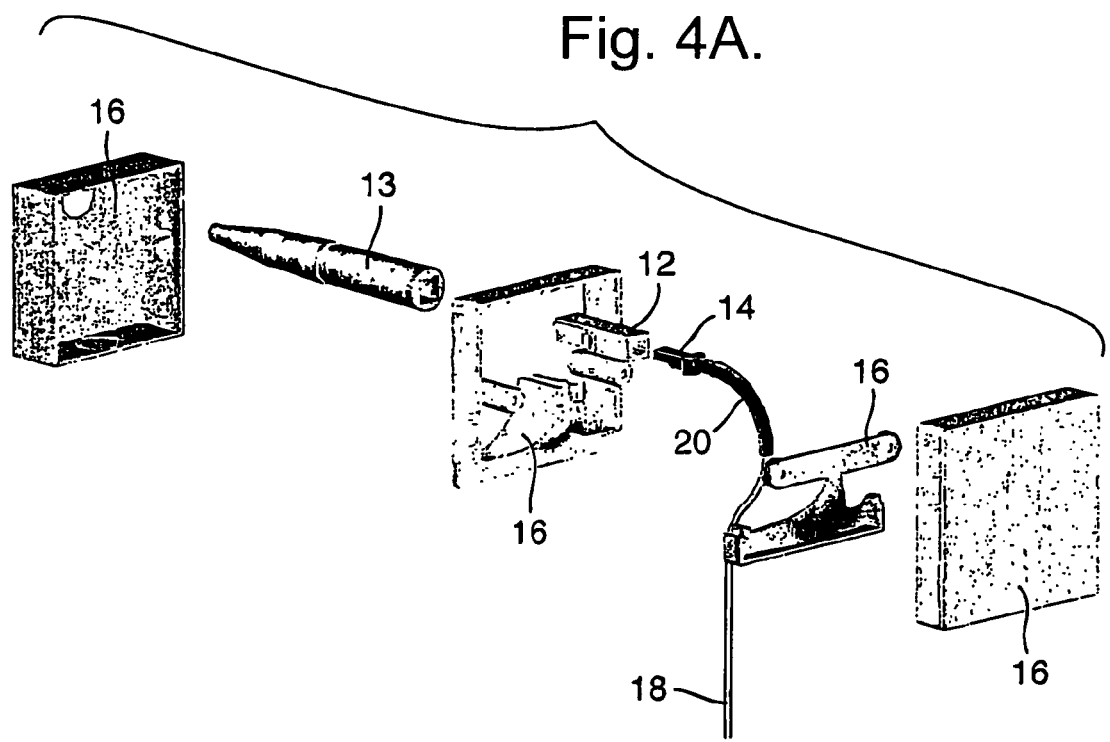
FIGS. 4A and 4B are exploded views of the connection device in its installed state.

FIG. 4A is an exploded view of the connection device in its installed state. The socket portion (12) is shown out of position from the hollow tube section (10). The connector plug (14) is depicted in a position ready to plug into the socket, here in a preferred "snapfit" arrangement. The parts (16) surrounding the tube (10), socket (12) and plug (14) are parts of the housing surrounding and protecting the network termination point incorporating the connection device.

Figure 4B:
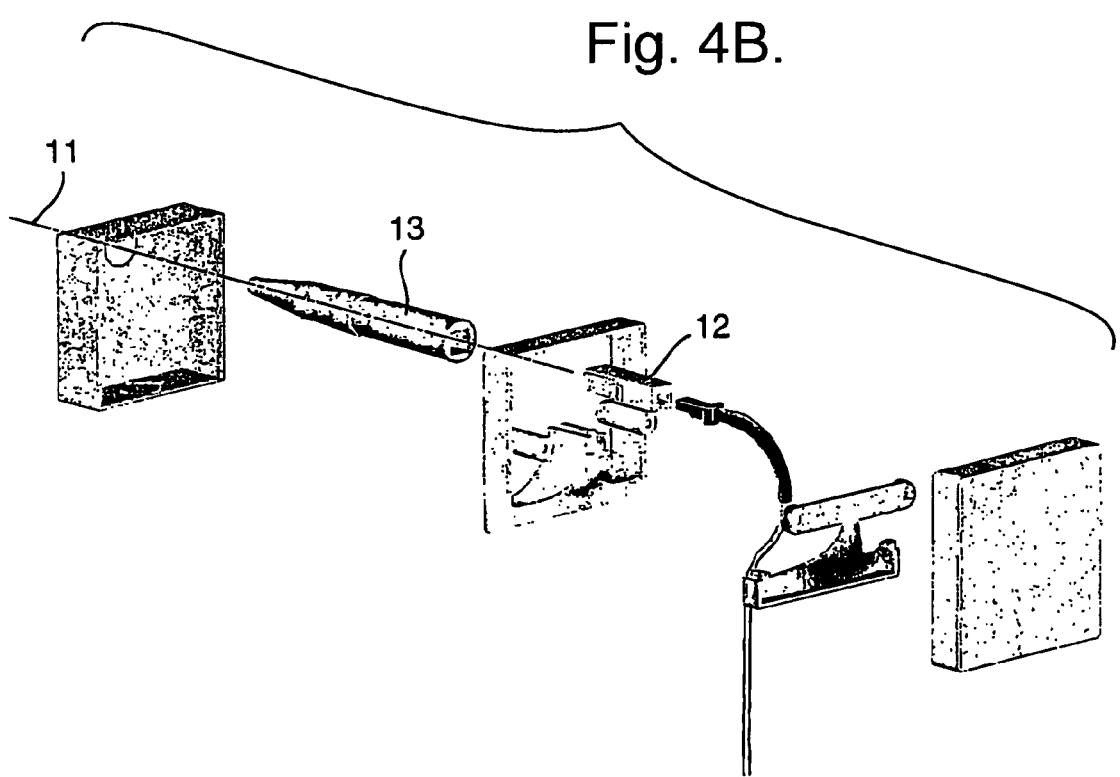

The process of installing the connection device into the bore will be described below in connection with FIG. 6 which discusses the second embodiment of the invention. However the installation process is similar for both embodiments. For present purposes however, it will be noted that the telecommunications cable is led through from the exterior wall to the interior wall and terminated onto the end of the socket (12) facing the exterior wall. FIG. 4B is a depiction of the path of the cable extending through the hollow tube from the socket towards the exterior wall.

It will thus be seen that by positioning the socket (12) within the hollow tube (10) of the connection device, considerable savings in the space taken up by plant can be made. Not only is the network termination box (5 of FIG. 2) no longer necessary, but the bend control means (20) on the, connector plug (14) allows the housing (16) of the connection device to take on a slimmer profile.

Second Embodiment

This second embodiment of the invention reduces the amount of telecommunications plant even further within a customer's premises, by incorporating electronic functionalities associated with ADSL, HPNA and the like within the hollow tube.

Figure 5:
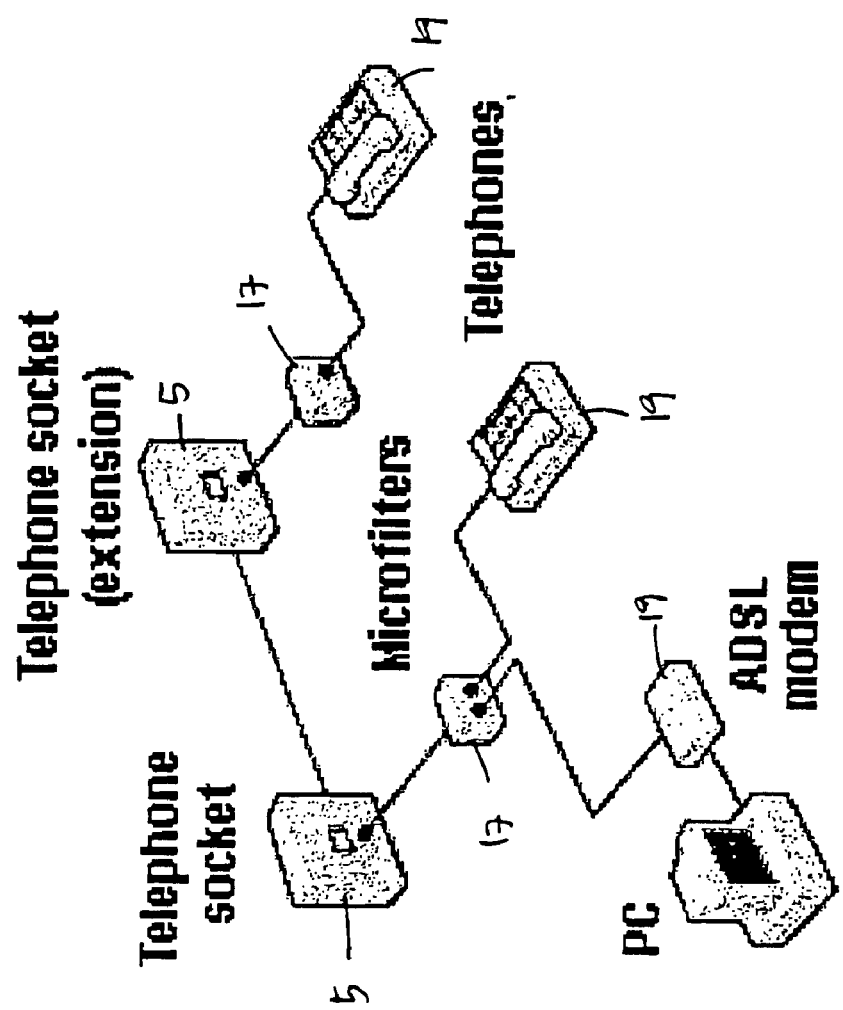
FIG. 5 depicts the layout of a network in the customer's premises including ADSL microfilters.

FIG. 5 illustrates how, in the prior art, the electronics such as microfilters (17) are positioned within the customer's premises network. Because they need to be positioned between the network termination unit box(es) (5) and the customer apparatus (19), they increase the complexity of the physical set up with the additional housing boxes and cables.

FIGS. 6A to 6H illustrate the steps of installing a connection device of the second embodiment of this invention. It will however be noted that the process is very similar to that for the first embodiment—any differences will be highlighted in the following discussion.

Figure 6A:
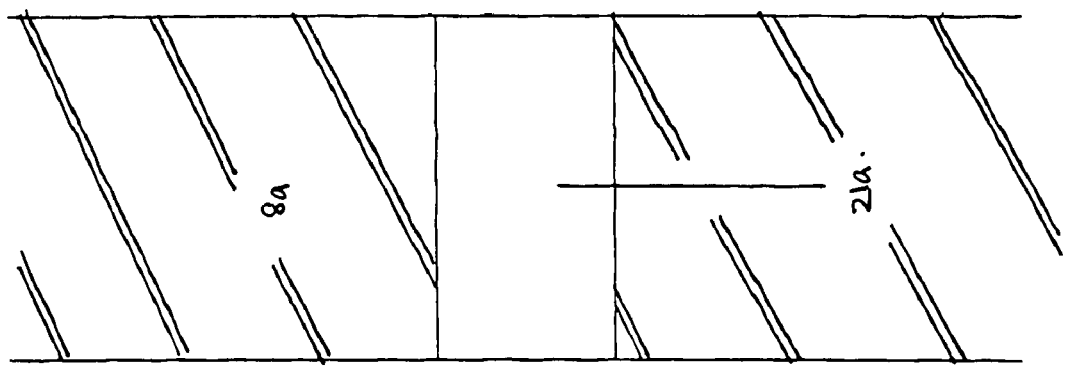
Figure 6A:
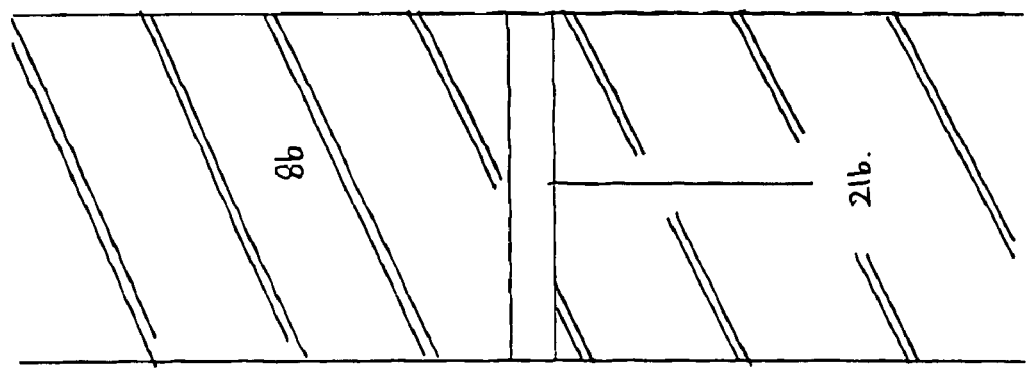

FIG. 6A shows two differently sized holes drilled opposite to each other in the internal and external walls. The hole (21b) in the exterior wall (8b) can be typically 12 mm in diameter, smaller than the hole (21a) on the interior wall (8a) which could be about 50 mm in diameter. It would be noted that the tube used in this second embodiment of the invention is also of a larger diameter than the tube (10) used for the first embodiment. This is necessitated by the addition of the electronic functionalities. For the avoidance of confusion, the tube of the second embodiment will be referred to henceforth as the hollow wallplug (101).

The hole in the exterior wall (21b) and the hole for the first embodiment can be made using a standard power drill. The larger hole (21a) for the second embodiment can also be made by standard power tools, in conjunction, for example, with a core drill.

In FIG. 6B, the hollow wallplug (101) is inserted in the direction of the arrow. The wallplug is a frictional fit into the wall and it is preferable to use a special tool to position the wallplug correctly in place. The outer profile of the wallplug is arranged with circumferential flanges or webs, so that with the aid of the tool it cannot be pushed too far into the wall. The flanges also discourage movement of the device once it is in position. The bore (21b) in the exterior wall can be left unfilled; alternatively it too can be filled with e.g. the device of the prior art discussed in connection with FIG. 2 above, or with any other suitable device to guide a cable through the exterior wall (8b).

Turning to FIG. 6C, a telecommunications cable from the external network (11) is inserted through the exterior wall (8b) via the hole (21b) in the direction of the arrow. Again, both embodiments of this invention are capable of receiving and managing copper wires or optical fibre. It is anticipated that the devices will be installed with copper wire, with the expectation that the copper will be replaced by fibre without the need to remove and replace the devices already installed.

When the entering cable reaches the interior wall (8a), it passes through the hollow wallplug (101) and emerges into the interior of the customer's premises.

Figure 6D:
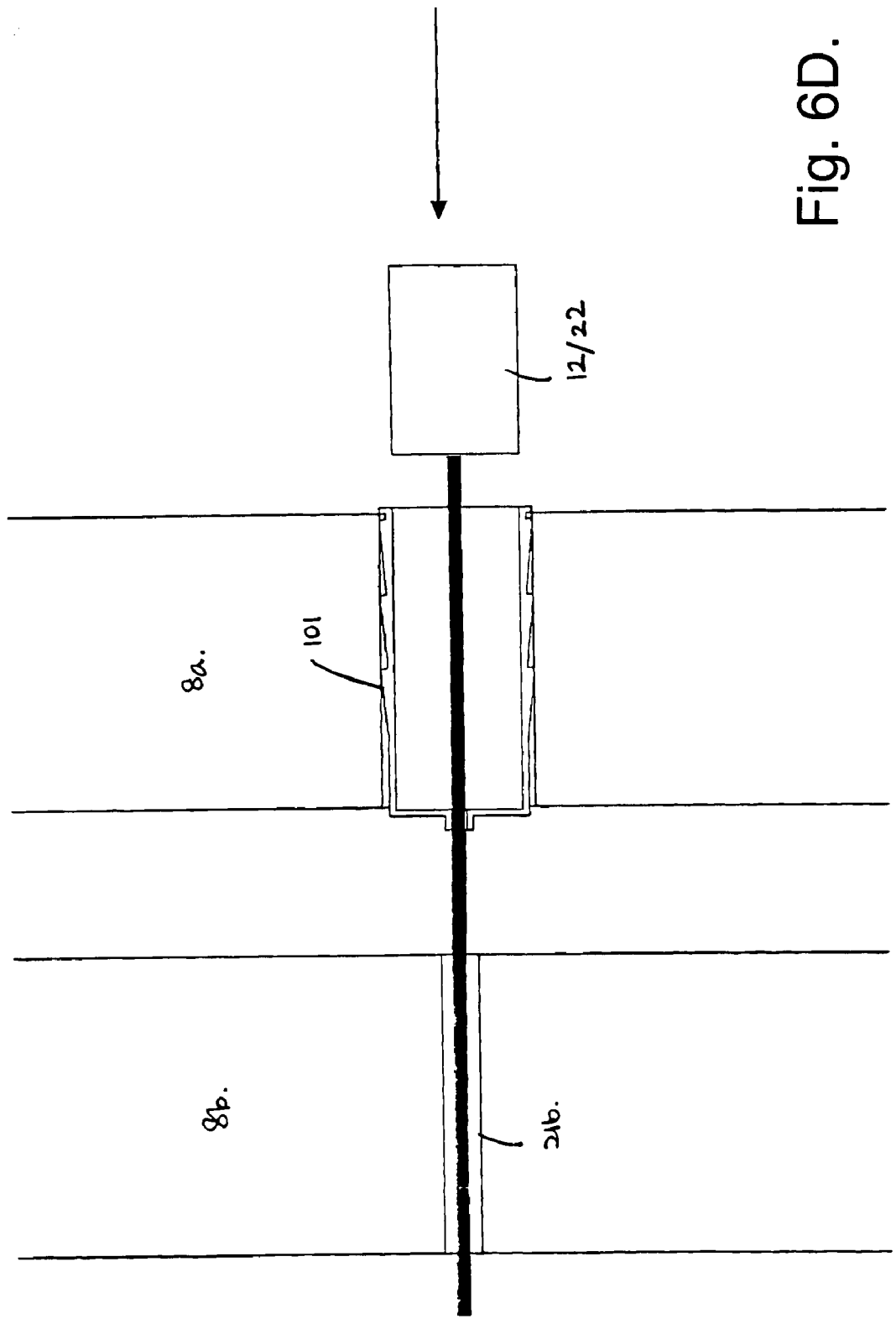

FIG. 6D illustrates how the cable is "field-terminated" where the cable is terminated directly on the back of the socket (12) (in the first embodiment) or the electronics module (22) (in the second embodiment). After the socket/electronics module (12/22) has been field terminated, it is pushed into the hollow tube (10) or the hollow wallplug (101) as the case may be, in the direction of the arrow.

In FIG. 6E, we can see the electronics module (22) sitting at the back of the hollow wallplug (101) in the second embodiment. This is so that as much bulk as possible can be buried within the walls. Doing so causes the excess cable (11) to be pushed back out in the direction of the exterior wall (8b) so that it ultimately emerges back outside the customer's premises. The excess cable is managed by accommodating it in a customer lead-in box (24) or other suitable designed enclosure mounted on the exterior wall (8b).

Excess cable would result as well in the first embodiment (referring back to FIG. 3), and is dealt with in the same way. This is so even though the socket (12) is not pushed to the back of the hollow tube (10), but sits within the tube so that it is located near the mouth of the bore in use and accessible to the connector plug (14).

As an alternative to field termination, the cable could be "pre-terminated", possibly factory-fitted. In the installation process, a short length of cable is connected or spliced to the external cable at an external connecting or splicing point. This applies to both the first and second embodiments.

Turning back to FIG. 6E, and concerning only the second embodiment: a service-specific module with a plug (28) is plugged into the socket of the electronics module (22), This module can be selected and is interchangeable by the customer, depending on their needs.

With reference back to FIG. 3B, the service-specific module is obviously irrelevant for the first embodiment; instead the connector plug (14) serves to connect the external network to the customer's telephones, etc.

In FIG. 6F, the front cover (30) is fitted onto the installation housing in both the first and second embodiments. The protrusion of the housing from the wall is much more streamlined than in the case of the standard network termination box (3 in FIG. 1). While the prior art box typically juts 36 mm from the wall, the network termination point housing shown in this drawing of the second embodiment extends just 10 mm to 15 mm from the wall surface. This is due in part to the recessing of the socket of the electronics module (22) within the body of the wall. As with the case in the first embodiment, this slimmed profile of the network termination point housing comes in conjunction with the doing away of the bulky termination box discussed in connection with FIG. 1.

Figure 6H:
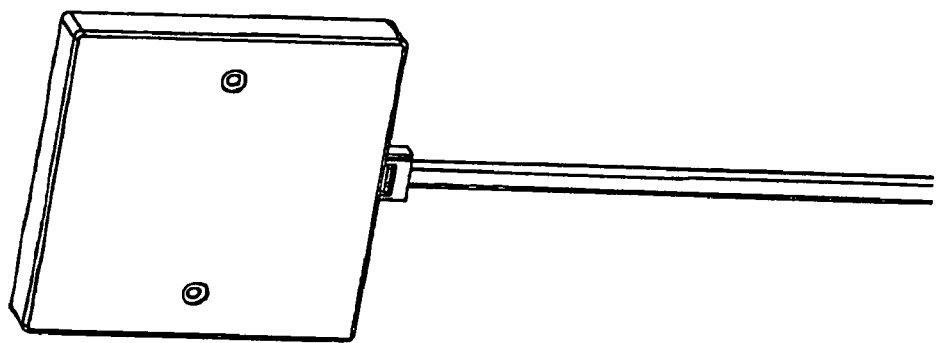

FIGS. 6G and 6H refer only to the second embodiment of the invention. The socket is located at a position on the installation housing so that the connector plug (14) "snap-fits" into the socket in a direction parallel to the wall surface. This has the happy result that the gains made in reducing protrusion of plant from the wall are not in any way lost. Not only is the installation more aesthetically sleek and pleasing, but also very real technical benefits lie in the reduced risk of both damage, and cost from the need to procure and install the housing and equipment previously needed.

FIG. 7 is a depiction of the components making up the housing of the network termination installation. The wall fixing plate (30) is in use mounted on the wall over the mouth of the hole (21a). The plug of the service specific module (28) fits into the socket located in the wall fixing plate. The cover (30) seals and protects the installation.

A further advantage of the second embodiment of the invention is gained when used in conjunction with a larger enclosure or housing positioned proximate to or within the fabric of the external wall. This would allow access to be gained, with suitable tools designed specifically for the purpose for disengaging connector plugs such the RJ-11 or RJ-45, to the electronics/cable termination module (22) for the purpose of removing the electronics module for either testing and/or replacement or to allow the copper cable to be upgraded to optical fibre.

The hollow tube (10) and the hollow wallplug (101) will typically be made of a high-impact plastic such as a polyamide (nylon), wither with or without reinforcement. Suitable materials include Ultramid™ Polyamide 6/6, or Ultramid™ B3L (a polyamide 6), both from BASF. These and other polyamides can, like other thermoplastics, conveniently be injection-moulded to produce stable and accurately dimensioned products at high speed. In general, materials currently used for producing high performance wallplugs (such as Ultramid™ B3L, referred to above) will be suitable for forming the main body—viz. hollow tube (10) or hollow wallplug (101)—of the devices according to the invention. Generally less preferred but still possible would be the use of metal for forming the main body. The use of aluminium or zinc based alloys is preferred as this would permit the use of die casting in manufacture as well as giving resistance to corrosion— related staining of wall surface and wall coverings (which could be expected to be potentially problematic with ferrous metals.

The configurations as described above and in the drawings are for ease of description only and not meant to restrict the use of the connection device in use. The skilled person would realise that various configurations and permutations on the methods and devices described are possible within the scope of this invention as disclosed.

What is claimed is:

1. A network termination wall plug suitable for connecting an item of telecommunications customer equipment located inside a telecommunications customer premise to an external telecommunications network, wherein the customer equipment and the network are separated by a wall having an exterior side exposed on the outside of a building structure and an interior side located inside the building structure, the wall including a bore communicating through the wall, the network termination wall plug comprising:
   a hollow body in the form of a tube engageable in the bore, the tube including
      (i) termination means to terminate an exterior telecommunications line connected to the telecommunications network; and
      (ii) connection means to receive a connector of the item of telecommunications customer equipment,
   the termination means and connection means being so arranged that with a telecommunications line terminated on the termination means, connection of the connector to the connection means provides a network terminating interconnection between the customer equipment and the telecommunications network.

2. A network termination wall plug according to claim 1, further comprising:
   a housing box including a cavity communicating with said connection means, said housing box also containing at least part of said connector means; and
   wherein the connection means comprises a first inter-engageable member suitable for coupling to a second inter-engageable member, the second inter-engageable member being connected to the item of telecommunications customer equipment.

3. A network termination wall plug according to claim 2 wherein the first inter-engageable member is a line jack outlet.

4. A network termination wall plug according to claim 1 wherein the hollow body is further adapted to guide the path of the telecommunication line along the bore.

5. A network termination wall plug comprising:
   a generally cylindrical body having circumferential irregularities to be received within and frictionally engage a bore in a wall having an exterior side exposed on the outside of a building structure and an interior side located inside the building structure,
   the body having at an interior end a cavity housing an electrical or optical connector,
   the body also having a passageway communicating with an opposite exterior end of the cavity to permit a telecommunications network cable to pass into the cavity housing and to be terminated at the connector.

6. A network termination wall plug as claimed in claim 1 which tapers in its external dimensions throughout its length and being widest at said interior end.

7. A network termination wall plug as claimed in claim 1 which does not taper in its external dimensions throughout its entire length but whose said opposite exterior end is conical, tapering away from said interior end.

8. A network termination wall plug as claimed in claim 1 wherein said interior end of the plug is un-tapered in its external dimensions.

9. A network termination wall plug as claimed in claim 1 wherein at least part of the exterior periphery of the hollow body is provided with circumferential flanges.

10. A network termination wall plug as claimed in claim 5 wherein the connector is retained in the cavity by means of a snap-fit coupling.

11. A network termination wall plug as claimed in claim 10 wherein the snap-fit coupling is provided between part of the connector and part of the hollow body.

12. A network termination wall plug as claimed in claim 11 wherein the snap-fit coupling is provided between part of the body and a further component, the connector being secured within the cavity by the further component.

13. A network termination wall plug as claimed in claim 1, wherein the hollow body is molded from a polyamide plastics material.

14. A network termination wall plug as claimed in claim 5, located within a bore in a wall having an exterior side exposed on the outside of a building structure and an interior side located inside the building structure, the cavity being contained within the wall.

15. A wall plug suitable for connecting an item of interior customer telecommunications equipment to an external telecommunications network, wherein the customer equipment and the external network are separated by a wall, the wall including a bore communicating through the wall, the wall plug comprising:
   a hollow body in the form of a tube engageable in the bore, the tube including
      (i) termination means, including an electronic module, for terminating a cable connected to the external network; and
      (ii) connecting means to receive a connector of the item of customer telecommunications equipment;
   the termination and connection means being so arranged that with the cable terminated on the termination means, connection of the connector to the connection means provides an interconnection between the equipment and the external network.

16. A wall plug according to claim 15 wherein the connection means comprises an inter-engageable member suitable for coupling to a second inter-engageable member, the second inter-engageable member being connected to the item of telecommunications equipment.

17. A wall plug according to claim 16 wherein the first inter-engageable member is a line jack outlet.

18. A wall plug according to claim 15 wherein the body is further adapted to guide the path of the cable along the bore.

19. A wall plug according to claim 15 wherein the body has at one end a cavity housing an electrical or optical connector, a passageway coupled to the cavity to permit a communications cable to pass into the housing and to couple to the connector.

20. A wall plug as claimed in claim 15 which tapers throughout its length and being widest at said one end.

21. A wall plug as claimed in claim 15 which does not taper throughout its length but whose end remote from said one end is conical, tapering away from said one end.

22. A wall plug as claimed in claim 15 wherein said one end of the plug is untapered.

23. A wall plug as claimed in claim 15 wherein at least part of the exterior periphery of the body is provided with circumferential flanges.

24. A wall plug as claimed in claim 19 wherein the connector is retained in the cavity by means of a snap-fit coupling.

25. A wall plug as claimed in claim 24 wherein the snap-fit coupling is provided between part of the connector and part of the body.

26. A wall plug as claimed in claim 25 wherein the snap-fit coupling is provided between part of the body and a further component, the connector being secured within the cavity by the further component.

27. A wall plug as claimed in claim 15 wherein the body is molded from a polyamide plastics material.

28. A wall plug as claimed in claim 19 located within a bore in a wall, the cavity being contained within the wall.

29. A wall plug as claimed in claim 15 wherein the electronic module comprises functionalities relating to any one or more of: test and diagnosis, ADSL, or HPNA.

* * * * *